United States Patent [19]

Maegawa

[11] Patent Number: 5,387,643
[45] Date of Patent: Feb. 7, 1995

[54] COMPOSITION OF A CATIONIC MICRO-EMULSION AND ITS PREPARATION METHOD

[75] Inventor: Masao Maegawa, Kashiba, Japan

[73] Assignee: National Starch and Chemical Investment Holding Corporation, Wilmington, Del.

[21] Appl. No.: 107,793

[22] PCT Filed: Jun. 17, 1993

[86] PCT No.: PCT/US93/05841
§ 371 Date: Feb. 17, 1994
§ 102(e) Date: Feb. 17, 1994

[87] PCT Pub. No.: WO93/25625
PCT Pub. Date: Dec. 23, 1993

[30] Foreign Application Priority Data

Jun. 18, 1992 [JP] Japan .................. 4-159375

[51] Int. Cl.$^6$ .............. C08L 37/00; C08L 51/06; C08L 83/00
[52] U.S. Cl. .................... 524/804; 524/805; 524/806; 524/811; 524/815; 524/458; 523/201; 523/202; 523/203; 525/254; 525/259; 525/902
[58] Field of Search ............ 523/201, 202, 203, 212, 523/216; 524/458, 529, 804, 811, 815; 525/354, 902, 259; 526/279, 310

[56] References Cited

U.S. PATENT DOCUMENTS

| | | |
|---|---|---|
| 4,427,819 | 1/1984 | Wessling et al. .............. 523/201 |
| 4,746,552 | 5/1988 | Tokumoto et al. .............. 427/393.6 |
| 4,865,917 | 9/1989 | Lindner et al. .............. 525/902 |
| 4,897,499 | 1/1990 | Hutton et al. .............. 549/552 |
| 5,250,602 | 10/1993 | Itoda et al. .............. 524/458 |
| 5,288,771 | 2/1994 | Takaya et al. .............. 523/201 |

FOREIGN PATENT DOCUMENTS

| | | |
|---|---|---|
| 0251166A1 | 1/1988 | European Pat. Off. . |
| 3229766A | 10/1991 | Japan . |
| 3229766 | 10/1991 | Japan . |
| 4154874 | 5/1992 | Japan . |
| 5031459 | 2/1993 | Japan . |

*Primary Examiner*—Tae H. Yoon
*Attorney, Agent, or Firm*—Ellen T. Dec

[57] ABSTRACT

In present invention, cationic particle having two-layer structure wherein copolymerized resin comprising a specific copolymer is protected with a film of water soluble resin is contained in aqueous medium. In this way, a glossy film can be obtained by employing the composition of the cationic micro-emulsion; moreover, this film is superior in waterproof, weatherproof, and the like. This composition of the cationic micro-emulsion is effective as top coat material for painting, sealer, and the like.

8 Claims, No Drawings

COMPOSITION OF A CATIONIC MICRO-EMULSION AND ITS PREPARATION METHOD

FIELD OF THE INVENTION

The present invention relates to composition of a cationic micro-emulsion employed for top coat material for paint, sealer, and the like, and its preparation method.

BACKGROUND OF THE INVENTION

Heretofore, solvent type resin composition wherein synthetic resin is dissolved in organic solvent has been employed as material to form a film by applying on a surface of base materials. However, said solvent type resin composition has hygienic and safety problems, and compositions of a water soluble emulsion is employed as a substitute. Particularly, in order to obtain composition of a cationic micro-emulsion which has crosslinking property at an ordinary temperature and contains particles which have a diameter of not more than 0.1 μm so that a close film can be formed and a glossiness can be obtained, the following methods have been suggested (1) a preparation method for micro-emulsion composition wherein a large amount of emulsifier is used to copolymerize crosslinking type monomer, and (2) a method wherein micro-gel fine particle synthesized by emulsion polymerization employing compound containing quaternary ammonium salt as an emulsifier is reacted with compound containing a reactive functional group.

However, in the first method, a large amount of emulsifier is required for micro-emulsion, thus, the obtained cationic micro-emulsion composition has a disadvantage of considerable deterioration in waterproof. In the second method, there are also disadvantages, that is to say, waterproof of the obtained micro-emulsion composition is not high enough, and when a compounding ratio of the reactive functional group is increased in order to improve the waterproof, agglutinated substance occurs during polymerization, which expands a diameter of micro-emulsion particle and makes it hard to form a glossy film.

OBJECT OF THE INVENTION

Accordingly, it is an object of the present invention to provide composition of a cationic micro-emulsion superior in adhesion to base materials, waterproof, weatherproof, and contamination resistance having a glossiness, and its preparation method.

SUMMARY OF THE INVENTION

The first embodiment of the present invention is directed to an aqueous cationic micro-emulsion comprising cationic particles having a two-layer structure, said structure consisting of 100 parts of an inner component (B) protected with an outer film of 10 to 100 parts of component (A), wherein component (A) is a water soluble resin comprising a copolymer of (a) a structural unit comprising a cationic alkali-crosslinkable monomer represented by the following constitutional formula:

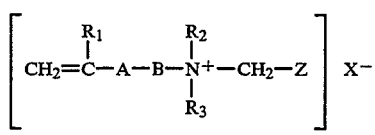

where
$R_1$: —H or —CH$_3$;
$R_2$, $R_3$: —CH$_3$ or —C$_2$H$_5$, and $R_2$ and $R_3$ may be the same or different;
A: —COO or —CONH;
B: (—CH$_2$—)$_n$, n=1 to 3;
Z:

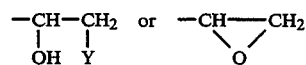

X, Y: A halogen atom of F, Cl or Br;

(b) a structural unit comprising an alkoxysilane monomer containing at least one reactive group selected among a vinyl group, an acryl group, and a methacryl group; and (c) a structural unit comprising an olefinic unsaturated monomer, provided that (a) occupies not less than 5% by weight relative to the total quantity of component (A), (b) occupies not less than 0.5% by weight relative to the total quantity of component (A), and (c) occupies not more than 94.5% by weight relative to the total quantity of component (A); and Wherein (B) is a copolymerized resin derived from:

(d) a structural unit comprising an alkoxysilane monomer containing at least one reactive group selected among a vinyl group, an acryl group, and a methacryl group, and (e) a structural unit comprising an olefinic unsaturated monomer, provided that (d) occupies not less than 0.5% by weight relative to the total quantity of component (B), and (e) occupies not more than 99.5% by weight relative to the total quantity of component (B).

Also, a second embodiment of the present invention is directed to a preparation method for composition of a cationic micro-emulsion comprising a process for preparing water soluble resin in aqueous medium by copolymerizing component (a), component (b), and component (c) defined below, a process for preparing copolymerized resin by copolymerizing component (d) and component (e) defined below, and a process for compounding said water soluble resin at the rate of 10 to 100 parts by weight corresponding to every 100 parts by weight of said copolymerized resin, and preparing the composition of the cationic micro-emulsion containing cationic particle wherein said copolymerized resin is protected with a film of said water soluble resin wherein
(a) is a cationic alkali-crosslinkable monomer represented by the following formulas

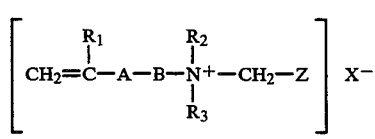

where

R$_1$: —H or —CH$_3$

R$_2$, R$_3$: —CH$_3$ or —C$_2$H$_5$, and R$_2$ and R$_3$ may be the same or different.

A: —COO or —CONH

B: (—CH$_2$—)$_n$, n=1 to 3

Z:

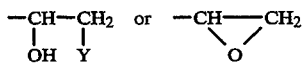 

X, Y: A halogen atom of F, Cl, or Br;

(b) is an alkoxysilane monomer containing at least one reactive group selected among a vinyl group, an acryl group, and a methacryl group;

(c) is an olefinic unsaturated monomer; provided that the component (a) occupies not less than 5% by weight of the component (a), (b) and (c), the component (b) occupies not less than 0.5% by weight of the component (a), (b) and (c), the component (c) occupies not more than 94.5% by weight of the component (a), (b) and (c);

(d) is an alkoxysilane monomer containing at least one reactive group selected among a vinyl group, an acryl group, and a methacryl group;

(e) is an olefinic unsaturated monomer; provided that the component (d) occupies not less than 0.5% by weight of the component (d) and (e), and the component (e) occupies not more than 99.5% by weight of the component (d) and (e).

Namely, inventors of the present invention have shown that the emulsion composition are excellent in adhesion to base materials, waterproof, weatherproof, and contamination resistance having a glossiness. As a result, in aqueous medium, the water soluble resin was (component A) was prepared by copolymerizing said component (a), (b) and (c) at the specific ratio, and the copolymerized resin (component B) was prepared by copolymerizing said component (d) and (e) at the specific ratio. And, the cationic particle was prepared by compounding said water soluble resin (component A) and copolymerized resin (component B) at the specific ratio, wherein said copolymerized resin (component B) was protected with a film of said water soluble resin (component A). The accordingly obtained composition of the cationic micro-emulsion was satisfactory in the stability of polymerization, and had a close film and a high glossiness since the cationic particle contained in the medium was formed very closely. Besides, it was found out that said composition was superior in adhesion to various base materials, waterproof, weatherproof, and contamination resistance, ad the invention was achieved.

DETAILED DESCRIPTION OF THE INVENTION

For an aqueous medium employed for the present invention, water is suitable. However, in order to raise solubility of a cationic monomer to be polymerized, or raise permeability to base materials, organic solvent which is easily soluble in water may be used in combination with water. Also, the organic solvent which is easily soluble in water may be used independently. As such organic solvent, there are isopropyl alcohol, methanol, ethanol, propanol, acetone, methylethyl ketone, dioxane, ethylene glycol, propylene glycol, glycerin, methyl carbitol, ethyl carbitol, butyl carbitol, methyl cellosolve, ethyl cellosolve, acetic acid, ester acetate of said alcohol, ester acetate of said carbitol, ester acetate of said cellosolve, and the like. When such organic solvent is combined with water, it is preferable that the organic solvent is employed within the range of not more than 50% by weight (abbreviated as % hereinafter) of the whole medium, and more preferable within the range of not more than 20%. Further, when said organic solvent is employed, it may be recovered by distillation and the like after polymerization reaction is completed.

The composition of the cationic micro-emulsion according to the present invention contains in said aqueous medium cationic particle having a two-layer structure said structure consisting of 100 parts of an inner component (B) protected with an outer film of 10 to 100 parts of component (A), wherein component (A) is a water soluble resin comprising a copolymer of:

(a) a structural unit comprising a cationic alkali-crosslinkable monomer represented by the following formula:

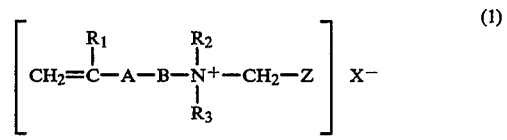 (1)

where

R$_1$: —H or —CH$_3$;

R$_2$, R$_3$: —CH$_3$ or —C$_2$H$_5$, and R$_2$ and R$_3$ may be the same or different;

A: —COO or —CONH;

B: (—CH$_2$—)$_n$, n=1 to 3;

Z:

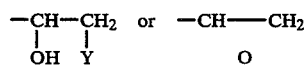

X, Y: A halogen atom of F, Cl, or Br;

(b) a structural unit comprising an alkoxysilane monomer containing at least one reactive group selected among a vinyl group, an acryl group, and a methacryl group; and (c) a structural unit comprising an olefinic unsaturated monomer, provided that (a) occupies not less than 5% by weight relative to the total quantity of component (A), (b) occupies not less than 0.5% by weight relative to the total quantity of component (A), and (c) occupies not more than 94.5% by weight relative to the total quantity of component (A); and where (B) is a copolymerized resin derived from:

(d) a structural unit comprising an alkoxysilane monomer containing at least one reactive group selected among a vinyl group, an acryl group, and a methacryl group, and (e) a structural unit comprising an olefinic unsaturated monomer, provided that (d) occupies not less than 0.5% by weight relative to the total quantity of component (B), and (e) occupies not more than 99.5% by weight relative to the total quantity of component (B).

As the cationic alkali-crosslinkable monomer (component a) represented by said constitutional formula (1), there are halogenated salt of dimethyl aminoethylacrylamide epichlorohydrin adduct, halogenated salt of dimethyl aminomethylmethacrylamide epichlorohydrin adduct, halogenated salt and alkyl sulfonate salt of dimethyl aminopropylacrylamide epichlorohydrin adduct, halogenated salt and alkyl sulfonate salt of dimethyl aminopropylmethacrylamide epichlorohydrin adduct, halogenated salt of dimethyl aminomethylacrylester epichlorohydrin adduct, halogenated salt of dimethyl aminomethylmethacrylester epichlorohydrin adduct, halogenated salt of dimethyl aminopropylacrylester epichlorohydrin adduct, halogenated salt and alkyl sulfonate salt of dimethyl aminopropylmethacrylester epichlorohydrin adduct, and epoxide which is equivalent for the above. As such epoxide, there are compositions represented by the following formula (1):

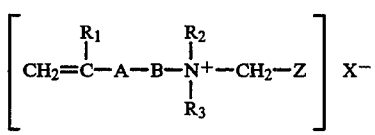

where
R$_1$: —H or —CH$_3$;
R$_2$, R$_3$: —CH$_3$ or —C$_2$H$_5$, and R$_2$ and R$_3$ may be the same or different;
A: —COO or —CONH;
B: (—CH$_2$—)$_n$, n=1 to 3;
Z:

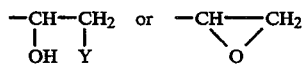

X, Y: A halogen atom of F, Cl, or Br;

And, it is necessary to compound said cationic alkali-crosslinkable monomer at the ratio of not less than 5% by weight (abbreviated as % hereinafter) of the total quantity of component (A). That is, when the compounding ratio of the cationic alkali-crosslinkable monomer is less than 5%, the formed polymer is not soluble in the aqueous medium, a diameter of the obtained emulsion grain increases resulting an insufficient glossiness, toughness of the obtained film and adhesion to various materials.

As said alkoxysilane monomer (component b), there are vinyl methyldiethoxysilane, vinyl dimethylmethoxysilane, vinyl dimethylethoxysilane, vinyl methyldi(2-methoxy ethoxy) silane, vinyl dimethyl(2-methoxy ethoxy) silane, 3-methacryloxypropyl methyldimethoxy silane, 3-m ethacryloxypropyl dimethylmethoxy silane, and the like. It is necessary to compound said alkoxysilane monomer (component b) at the ratio of not less than 0.5% by weight of the total quantity of compound (A). That is, when the compounding ratio of the alkoxysilane monomer (component b) is less than 0.5%, the waterproof, toughness, adhesion to the various materials, weatherproof, and contamination resistance of the obtained film are insufficient in the same way as the case of the above-mentioned cationic alkali-crosslinkable type monomer.

As said olefinic unsaturated monomer (component c), there are hydrophobic monomers such as vinyl acetate, alkylester acrylate, alkylester methacrylate, styrene, acrylonitrile, methacrylonitrile. They can be used either alone or in combination. Furthermore, there are hydrophilic monomers such as acrylic acid, methacrylic acid, acrylic amide or methacrylic amide, methylolamide, alkoxymethylamide, alkylaminoester, vinyl monochloroacetate, methyl methacrylate, butyl acrylate, 2-ethyl hexylacrylate. They can also be used either alone or in combination. Said hydrophilic monomers are, not to mention, employed within the range so that the formed polymer does not become soluble in the aqueous medium. By copolymerizing said olefinic unsaturated monomer with said compound a and b, glued connection and adhesion between the surface or base materials and finishing coat, adhesion and the like are improved. It is necessary to compound said olefinic unsaturated monomer (compound c) at the ratio of not more than 94.5% of the total quantity of compound A. That is, when the ratio of the olefinic unsaturated monomers is over 94.5%, the formed polymer does not become soluble in the aqueous medium, and a diameter of the obtained emulsion grain increases resulting an insufficient glossiness, toughness of the obtained film and adhesive to various materials.

As said alkoxysilane monomer which is component d, the same monomers as mentioned for said alkoxysilane monomer (component b) are employed. And, it is necessary to compound said alkoxysilane monomer which is component d at the ratio of not less than 0.5% of the total quantity of component B. That is, when the ratio of the alkoxysilane monomer (component d) is less than 0.5%, the waterproof, toughness, adhesion to the various materials, weatherproof, and contamination resistance of the obtained film are insufficient.

As said olefinic unsaturated monomer which is component e, the same monomers as mentioned for the olefinic unsaturated monomer (component c), in said component A are employed. And it is necessary to compound the olefinic unsaturated monomer as component (e) at the ratio of not more than 99.5% of the total quantity of component (B). That is, when the ratio of the olefinic unsaturated monomer is over 99.5%, the toughness of the obtained film and adhesion to the various base materials are sufficient.

The composition of the cationic micro-emulsion according to the present invention is obtained as follows, for example. That is, the water soluble resin (component A) is prepared by adding polymerization initiator in water, organic solvent, or mixture of the water and the organic solvent which is a polymerization medium, maintaining the compound in acidic state by acid, and compounding and copolymerizing said medium with said cationic alkali-crosslinkable monomer (component a), alkoxysilane monomer (component b), and olefinic unsaturated monomer (component c). Then, after compounding water to said water soluble resin (component A) and stirring, complete reaction is conducted by dripping said alkoxysilane monomer (component d) and olefinic unsaturated monomer (component e) at the temperature of 60° to 90° C. over a period of 1 to 5 hours, and further preparing copolymerized resin (component B) at the temperature of 60° to 90° C. over a period of 1 to 3 hours. In this manner, the composition of the cationic micro-emulsion can be obtained, which contains the cationic particle having two-layer structure in its aqueous medium wherein the copolymerized resin (component B) is protected with the film of the water soluble resin (component A). Further, polymerization catalyzer or water can be added when said component (d) and (e) are dripped.

In the present preparation, it is preferable to set the ratio of said water soluble resin (component A) at 10 to 100 parts by weight corresponding to every 100 parts by weight (abbreviated as "parts" hereinafter) of the copolymerized resin of said alkoxysilane monomer (component d) and said olefinic unsaturated monomer (component e). 30 to 50 parts in more preferable. That is, when the compounding ratio of the water soluble resin (component A) is less than 10 parts, emulsion is gelled, and when over 100 part, it is seen that waterproof and toughness of the obtained film tend to insufficient.

Also, in said preparation, it is necessary to selectively employ the medium which does not obstruct the polymerization reaction. And, as the polymerization initiator, thee are benzoyl peroxide, azobisisobutyronitrile, 2,2'-azobisaminodipropane hydrochloride, ammonium persulfate, and the like. Furthermore, as acid for adjusting pH in order to maintain said medium in acidic state, there are organic acid such as formic acid, acetic acid, and oxalic acid, and inorganic acid such as hydrochloric acid, sulfuric acid, nitric acid, and acetic acid. And, chain transferee such as lauryl mercaptan, and the like can be compounded when preparing the water soluble resin (compound A).

In the cationic particle of accordingly obtained composition of the cationic micro-emulsion comprises that said copolymerized resin (component B) is protected with the film of the water soluble resin (component A), and the diameter of each particle is formed to be not more than 0.1 μm. By forming the diameter of each particle not more than 0.1 μm, it became possible to form a close film and obtain the film with a superior glossiness.

The composition of the cationic micro-emulsion obtained as mentioned above is applied to surfaces of inorganic base materials such as concrete, mortar, slate plates, light weight calcium plates, gas concrete plates (ALC plate)., The applied composition permeates into the surface layer of the base material, and functional groups reactivated in alkaline, acidic or neutral domain and water are crosslinked in the drying process to form a firm film of three dimensional-net work structure having excellent adhesion to base materials, waterproof, weatherproof, and contamination resistance. That is, in the cationic particle in the composition, the water soluble resin (component A) of film protecting layer crosslinks among themselves, and the copolymerized resin (component B) crosslinks among themselves. As a result, solid and durable reinforcement is conducted to the base material, What is more, the composition of the cationic micro-emulsion according to the present invention, comprises the components wherein the cationic alkali-crosslinkable monomer and the alkoxysilane monomer are copolymerized, and the net work structure is formed in the wider pH domain with crosslinking not only in the alkaline base material, but also the neutral base material at the ordinary temperature. As said cationic alkali-crosslinkable monomer has strong water-solubility, it crosslinks in the alkaline state besides contributing the water soluble resin. Also, the alkoxysilane monomer hydrolyzes easily in the acidic and alkaline state, forms a silanol group and crosslinks.

The following working examples and comparative examples are further illustrative of the present invention.

EXAMPLES 1 TO 6 AND COMPARATIVE EXAMPLES A TO E

A four-necked flask fitted with a stirrer, a thermometer, and a reflux condenser was charged with 86 parts of isopropyl alcohol, 0.9 parts of azobisisobutyronitrile as polymerization initiator, 1 part of lauryl mercaptan as chain transferee, and 1 part of acetic acid as pH controller. And, monomer material comprising 49.,5 parts of methyl methacrylate, 20 parts of butyl acrylate, 20 parts of 2-ethyl hexylacrylate, 5 parts of styrene, 14.5 parts of epichlorohydrin adduct salt 55% aqueous solution of dimethyl aminopropyl methacrylamide, and 2.5 parts of 3-methacryloxypropyl trimethoxysilane were charged, polymerization reaction was conducted at the reflux temperature of isopropyl alcohol for 4 hours, and complete reaction was conducted for 2 hours by adding 0.1 parts of azobisisobutyronitrile. Further, 240 parts of water was put for dissolving, and isopropyl alcohol withdrawn at the temperature of 65° C. in reduced pressure to obtain even aqueous solution (water soluble resin) of 30% concentration. And, said aqueous solution and water were charged in a different four-necked flask at the ratio shown in the below-mentioned Table 1 and 2, and a temperature was raised to 70° C. with stirring. Then, monomer material comprising the composition shown in Table 1 and 2 was charged in a drop funnel, and 0.3 parts of 2,2-azobis-2-aminodipropane dihydrochloride, and 20 parts of water were charged in a different drop funnel. The monomer material was dropped over a period of 4 hours, and further, the complete reaction was conducted over a period of 2 hours at the temperature of 70° C. A concentration of the obtained emulsion was 40%, a viscosity of 7000 to 9000 cps, and pH was 4 to 5.

TABLE 1

|  | Working Example | | | | | |
|---|---|---|---|---|---|---|
|  | 1 | 2 | 3 | 4 | 5 | 6 |
| Colloid (parts) | | | | | | |
| Cationic water soluble solution (dry conversion) | 10 | 10 | 50 | 50 | 100 | 100 |
| Water | 122 | 122 | 88 | 88 | 47 | 47 |
| Monomer composition (parts) | | | | | | |
| Methyl methacrylate | 37.5 | 33.0 | 37.5 | 33.0 | 37.5 | 33.0 |
| Styrene | 19 | 19 | 19 | 19 | 19 | 19 |
| 2-ethyl hexyl acrylate | 43 | 43 | 43 | 43 | 43 | 43 |
| 3-methacryloxypropyl trimethoxysilane | 0.5 | 5.0 | 0.5 | 5.0 | 0.5 | 5.0 |
| Concentration (%) | 40.1 | 40.5 | 40.0 | 40.2 | 40.1 | 40.2 |
| Viscosity (cps) | 7150 | 7700 | 7750 | 8870 | 8060 | 8950 |
| pH | 4.7 | 4.7 | 4.5 | 4.5 | 4.3 | 4.3 |
| Diameter of particle (μm) | 0.098 | 0.089 | 0.091 | 0.068 | 0.084 | 0.065 |

TABLE 2

| | Comparative Example | | | | |
|---|---|---|---|---|---|
| | A | B | C | D | E |
| Colloid (parts) | | | | | |
| Cationic water soluble solution (dry conversion) | 5 | 10 | 50 | 100 | 120 |
| Water | 126 | 122 | 88 | 88 | 30 |
| Monomer composition (parts) | | | | | |
| Methyl methacrylate | 37.5 | 38.0 | 38.0 | 38.0 | 33.0 |
| Styrene | 19 | 19 | 19 | 19 | 19 |
| 2-ethyl hexyl acrylate | 43 | 43 | 43 | 43 | 43 |
| 3-methacryloxypropyl trimethoxysilane | 0.5 | — | — | — | 5.0 |
| Concentration (%) | gelled | 40.1 | 40.1 | 40.1 | 40.1 |
| Viscosity (cps) | gelled | 7150 | 7150 | 7150 | 7150 |
| pH | gelled | 4.7 | 4.7 | 4.7 | 4.7 |
| Diameter of particle (μm) | gelled | 0.098 | 0.098 | 0.098 | 0.098 |

Glossiness, weatherproof, and adhesion to base materials of thus obtained samples of the examples and comparative examples were measured and evaluated in the following method.

The results of the evaluation are shown in the below-mentioned Table 3 and 4.

Evaluation method of glossincas

The emulsion was applied on surface of hiding-charts (product of Nihon Test Panel Kogyo) with a thickness of 5 mm and dried at 20° C., and 60 degree relative—specular glossiness was measured by a deformation gloss meter (VG-1D type, a product of Nihon Denshoku Kogyo) in accordance with JIS-K-5400. And, when a relative-specular glossiness of a datum level is 100 in percentage, not less than 95% of the relative-specular glossiness was represented as ⊙, not less than 90% was represented as ○, and less than 80% was represented as .

Evaluation method of water resistance

A coating was prepared by compounding titan oxide and polyvinyl chloride (PVC) by 20% employing acryl emulsion (A-5210, a product of Kanebo NSC) with fine weather resistance as base emulsion. The coating was applied 1 mm in thickness on glass plates and dried at 20° C. And, test pieces were prepared by applying the emulsion 1 mm in thickness over said coating of the examples and comparative examples, and dried at 20° C. The test pieces were irradiated for 750 hours by a sunshine weather meter (WEL-SUN-HCB type, a product of Sugashikenkisha), and color difference was measured by a deformation gloss meter VG-1D type (a product of Nihon Denshoku Kogyo) and a color number was determined according to JIS-L-0805.

Evaluation method of adhesion to base materials (a) The emulsion in said examples and comparative examples having a concentration of 15% were applied to slate plates at the rate of 100 g/m², and set aside for 7 days at a room temperature to conduct a cross-cut adhesion test wherein 25 portions respectively have an area of 4 mm×4 mm. Warm water resisting adhesion was evaluated by sinking the pieces in warm water for 7 days at a temperature of 60° C., and conducting the cross-cut adhesion tests. As a result, the samples with not less than 23 portions left adhered were represented as   the samples with 20 to 22 portions left adhered were represented as ○, the samples with 10 to 19 portions left adhered were represented as ⊖ and the examples with not more than 9 portions were represented as ⊗.

(b) Emulsion in said examples and comparative examples were applied on surfaces of plastic base materials comprising polystyrene, polyphenylene oxide, and polyurethane (products of Nihon Test Panel Kogyo for standard tests) with a thickness of 5 mm, and dried for 5 minutes at a temperature of 80° C. to conduct cross-cut adhesion tests wherein 100 portions respectively have an area of 2 mm×2 mm. As a result, the samples with 100 partions left adhered were represented as ⊙, the samples with 90 to 99 partions left adhered were represented as ○, the samples with 80 to 89 partions left adhered were represented as ⊖, and the samples with more than 79 partions were represented as ⊗.

TABLE 3

| | Working example | | | | | |
|---|---|---|---|---|---|---|
| | 1 | 2 | 3 | 4 | 5 | 6 |
| Glossiness | ⊙ | ⊙ | ⊙ | ⊙ | ⊙ | ⊙ |
| Weather resistance | 5 | 5 | 5 | 5 | 5 | 5 |
| Adhesion to Base Materials | | | | | | |
| Slate plates | | | | | | |
| An ordinary temperature | ⊙ | ⊙ | ⊙ | ⊙ | ⊙ | ⊙ |
| Warm water resistance | ⊙ | ⊙ | ⊙ | ⊙ | ⊙ | ⊙ |
| Polystyrene | ⊙ | ⊙ | ⊙ | ⊙ | ⊙ | ⊙ |
| Polyphenylene oxide | ⊙ | ⊙ | ⊙ | ⊙ | ⊙ | ⊙ |
| Polyurethane | ⊙ | ⊙ | ⊙ | ⊙ | ⊙ | ⊙ |

TABLE 4

| | Comparative example | | | | |
|---|---|---|---|---|---|
| | A | B | C | D | E |
| Glossiness | * | ⊗ | ⊖ | ○ | ⊙ |
| Weather resistance | * | 4–5 | 4–5 | 4–5 | 4–5 |
| Adhesion to base materials | | | | | |
| Slate plates | | | | | |
| An ordinary temperature | * | ○ | ○ | ○ | ○ |
| Warm water resistance | * | ⊖ | ⊖ | ⊖ | ⊖ |
| Polystyrene | * | ○ | ○ | ○ | ○ |
| Polyphenylene oxide | * | ⊗ | ⊗ | ⊗ | ⊗ |
| Polyurethane | * | ⊖ | ⊖ | ⊖ | ⊖ |

*Impossible to measure because of gelation.

From the results shown in above Table 3 and 4, the samples of the comparative example A were gelled, and the samples in the other comparative examples were poorly evaluated in the adhesion to base materials or the glossiness. On a contrary, the samples in the examples were excellent all in the glossiness, weather resistance, and adhesion to base materials.

COMPARATIVE EXAMPLES F TO I

An emulsified polymer was prepared by employing the components at the ratio shown in below Table 5, and tests were conducted in the same manner as in the above-mentioned tests. Results were shown in the below Table 6.

TABLE 5

| | Comparative example | | | |
|---|---|---|---|---|
| | F | G | H | I |
| Monomer composition | | | | |
| Methyl methacrylate | 41 | 41 | 46 | 46 |
| Styrene | 19 | 19 | 19 | 19 |
| 2-ethyl hexyl acrylate | 30 | 30 | 30 | 30 |
| Dimethyl aminoethyl methacrylate | 5 | — | — | — |
| Dimethyl diallyl ammonium chloride | — | 5 | — | — |
| 3-methacryloxypropyl trimethoxysilane | 5 | 5 | 5 | 5 |
| Emulsifier composition catalyzer | | | | |
| Emulgen 935 *1 | 5 | 5 | 3 | 3 |
| Sanisol B-50 *2 | — | — | 2 | — |
| Qartamin 24P | — | — | — | 2 |
| Ammonium persulfate | 0.3 | 0.3 | 0.3 | 0.3 |
| Water | 157 | 157 | 157 | 157 |
| Concentration (%) | 40.1 | 40.3 | 40.0 | 40.0 |
| Viscosity (cps) | 830 | 700 | 630 | 670 |
| pH | 4.5 | 4.6 | 4.7 | 4.7 |
| Diameter of particle (μm) | 0.21 | 0.22 | 0.20 | 0.23 |

*1 Alkylbenzyl dimethylammonium chloride
*2 Lauryl trimethyl ammonium chloride

TABLE 6

| | Comparative example | | | |
|---|---|---|---|---|
| | F | G | H | I |
| Glossiness | ⊗ | ⊗ | ⊗ | ⊗ |
| Water resistance | 4 | 4 | 3~4 | 3~4 |
| Adhesion to base materials | | | | |
| Slate plates | | | | |
| An ordinary temperature | ○ | ○ | ○ | ○ |
| Warm water resistance | ⊖ | ⊖ | ⊖ | ⊖ |
| Polystyrene | ○ | ○ | ○ | ○ |
| Polyphenylene oxide | ⊗ | ⊗ | ⊗ | ⊗ |
| Polyurethane | ⊖ | ⊖ | ⊖ | ⊖ |

From results shown in the above Table 6, the glossiness was not seen in the samples of the comparative examples, and the adhesion to base materials, especially to polyphenylene oxide was poor.

EFFECT OF THE INVENTION

As mentioned hereinbefore, the present invention comprises steps of preparing water soluble resin (component A) by copolymerizing said component (a), (b), and (c) at a specific ration, and preparing copolymerized resin (component B) by polymerizing component (d) and (e) at a specific ratio. And, the composition of the cationic micro-emulsion is obtained by compounding said water soluble resin [component (A)] and said copolymerized resin [component (B)] at a specific ratio to prepare cationic particle wherein said copolymerized resin [component (B)] is protected with a film of said water soluble resin [component (A)]. Therefore, in the composition of the cationic micro-emulsion according to the present invention, stability of copolymerization is fine, and a close and highly glossy film is obtained since the cationic particle contained in a medium is formed extremely close. Also, excellent adhesion to various base materials, waterproof, weather resistance, and contamination resistance are available.

What is claimed is:

1. An aqueous, cationic micro-emulsion comprising cationic particles having a two-layer structure, said structure consisting of 100 parts of an inner component (B) protected with an outer film of 10 to 100 parts of component (A), wherein component (A) is a water soluble resin comprising a copolymer of
   (a) a structural unit comprising a cationic alkali-crosslinkable monomer represented by the following formula:

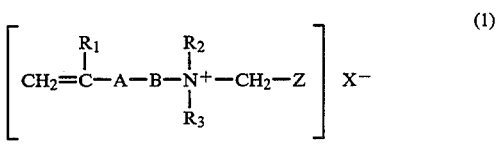

where
   $R_1$: —H or —CH$_3$;
   $R_2$, $R_3$: —CH$_3$ or —C$_2$H$_5$, and $R_2$ and $R_3$ may be the same or different;
   A: —COO or —CONH;
   B: (—CH$_2$—)$_n$, n=1 to 3;
   Z:

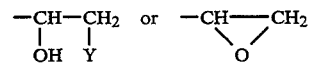

X, Y: A halogen atom of F, Cl, or Br;
   (b) a structural unit comprising an alkoxysilane monomer containing at least one reactive group selected from the group consisting of a vinyl group, an acyl group, and a methacryl; group and
   (c) a structural unit comprising an olefinic unsaturated monomer other than that described by (a) and (b), provided that (a) occupies not less than 5% by weight relative to the total quantity of component (A), (b) occupies not less than 0,5% by weight relative to the total quantity of component (A), and (c) occupies not more than 94.5% by weight relative to the total quantity of component (A); and wherein (B) is a polymerized resin derived from:
   (d) a structural unit comprising an alkoxysilane monomer containing at least one reactive group selected from the group consisting of a vinyl group, an acyl group, and a methacryl group; and
   (e) a structural unit comprising an olefinic unsaturated monomer other than that described by (d) provided that (d) occupies not less than 0.5% by weight relative to the total quantity of component (B), and (e) occupies not more than 99.5% by weight relative to the total quantity of component (B).

2. Composition of a cationic micro-emulsion according to claim 1 wherein a cationic alkali-crosslinkable monomer as component (a) is halogenated salt of dimethyl aminopropylmethacrylamide epichlorohydrin adduct.

3. Composition of a cationic micro-emulsion according to claim 1 wherein an alkoxysilane monomer as component (b) and (d) is methacryloxypropyl trimethoxysilane.

4. Composition of a cationic micro-emulsion according to claim 1 or wherein an alkoxysilane monomer as component (b) and (d) is vinyl trimethoxyethoxysilane.

5. A preparation method for composition of a cationic micro-emulsion comprising a process for preparing water soluble resin in aqueous medium by copolymerizing components (a), (b) and (c) defined below, a process for preparing copolymerized resin by copolymerizing components (d) and (e) defined below, and a process for compounding said water soluble resin at the rate of 10 to 100 parts by weight corresponding to every 100 parts by weight of said copolymerized resin, and preparing the composition of the cationic micro-emulsion containing cationic particle wherein said copolymerized resin is protected with a film of said water soluble resin wherein (a) is a cationic alkali-crosslinkable monomer represented by the following formula:

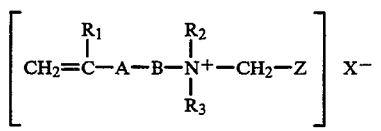 (1)

where
$R_1$: —H or —$CH_3$;
$R_2$, $R_3$: —$CH_3$ or —$C_2H_5$, and $R_2$ and $R_3$ may be the same or different;
A: —COO or —CONH;
B: (—$CH_2$—)$_n$, n=1 to 3;
Z:

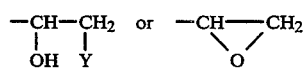

X, Y: A halogen atom of F, Cl, or Br;

(b) an alkoxysilane monomer containing at least one reactive group selected from the group consisting of a vinyl group, an acryl group, and a methacryl group;

(c) an olefinic unsaturated monomer other than that described by (a) and (b); provided that the component (a) occupies not less than 5% by weight of the component (a), (b) and (c), the component (b) occupies not less than 0.5% by weight of the component (a), (b) and (c), the component (c) occupies not more than 94.5% by weight of the component (a), (b) and (c);

(d) is an alkoxysilane monomer containing at least one reactive group selected from the group consisting of a vinyl group, an acryl group, and a methacryl group;

(e) is an olefinic unsaturated monomer other than that described by (d); provided that the component (d) occupies not less than 0.5% by weight of the component (d) and (e), and the component (e) occupies not more than 99.5% by weight of the component (d) and (e); provided that the component (d) occupies not less than 0.5% by weight of the component (d) and (e), and the component (e) occupies not more than 99.5% by weight of the component (d) and (e).

6. Composition of a cationic micro-emulsion according to claim 5 wherein a cationic alkali-crosslinkable monomer as component (a) is halogenated salt of dimethyl resin aminopropylmethacrylamide epichlorohydrin adduct.

7. Composition of a cationic micro-emulsion according to claim 5 or 6 wherein an alkoxysilane monomer as component (b) and (d) is methacryloxypropyl trimethoxysilane.

8. Composition of cationic micro-emulsion according to claim 5 or 6 wherein an alkoxysilane monomer as component (b) and (d) is vinyl trimethoxyethoxysilane.

* * * * *